United States Patent
Bruinink et al.

(10) Patent No.: US 7,646,454 B2
(45) Date of Patent: Jan. 12, 2010

(54) TRANSFLECTIVE LIQUID CRYSTAL DISPLAY DEVICE

(75) Inventors: Jacob Bruinink, Eindhoven (NL); Sander Jurgen Roosendaal, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 346 days.

(21) Appl. No.: 10/559,912

(22) PCT Filed: Jun. 2, 2004

(86) PCT No.: PCT/IB2004/050821

§ 371 (c)(1), (2), (4) Date: Dec. 7, 2005

(87) PCT Pub. No.: WO2004/111711

PCT Pub. Date: Dec. 23, 2004

(65) Prior Publication Data

US 2006/0158586 A1 Jul. 20, 2006

(30) Foreign Application Priority Data

Jun. 12, 2003 (EP) ................................. 031017221

(51) Int. Cl.
*G02F 1/1335* (2006.01)

(52) U.S. Cl. ........................ 349/114; 349/106; 349/107; 349/108; 349/109

(58) Field of Classification Search ................... 349/114, 349/117–119
See application file for complete search history.

(56) References Cited

U.S. PATENT DOCUMENTS

| | | | | |
|---|---|---|---|---|
| 6,280,889 | B1 * | 8/2001 | Hsieh et al. | 430/7 |
| 6,570,634 | B2 * | 5/2003 | Kim | 349/107 |
| 6,862,058 | B2 * | 3/2005 | Ikeno et al. | 349/114 |
| 2003/0043323 | A1 | 3/2003 | Roosendaal | |
| 2004/0004681 | A1 * | 1/2004 | Ozawa et al. | 349/61 |
| 2004/0105059 | A1 * | 6/2004 | Ohyama et al. | 349/114 |

FOREIGN PATENT DOCUMENTS

EP 1 109 053 6/2001

\* cited by examiner

*Primary Examiner*—David Nelms
*Assistant Examiner*—Thanh-Nhan P Nguyen

(57) ABSTRACT

A transflective Liquid Crystal Display device has a liquid crystalline (LC) cell with reflective portions (101 R) and transmissive portions (101 T). The LCD device has a dual cell-gap design, the cell gap (dT) for the transmissive portions differs from the cell gap (dR) for the reflective portions. According to the invention, this cell gap difference is effected by means of an optical retarder (120) inside the LC cell. A thickness of said optical retarder (120) is such as to compensate the difference in cell gaps. Preferably, the optical retarder is a patterned retarder extending essentially only over the reflective portions (101 R) of the cell, and having quarter wave retardance.

6 Claims, 1 Drawing Sheet

TRANSFLECTIVE LIQUID CRYSTAL DISPLAY DEVICE

Figure 1:
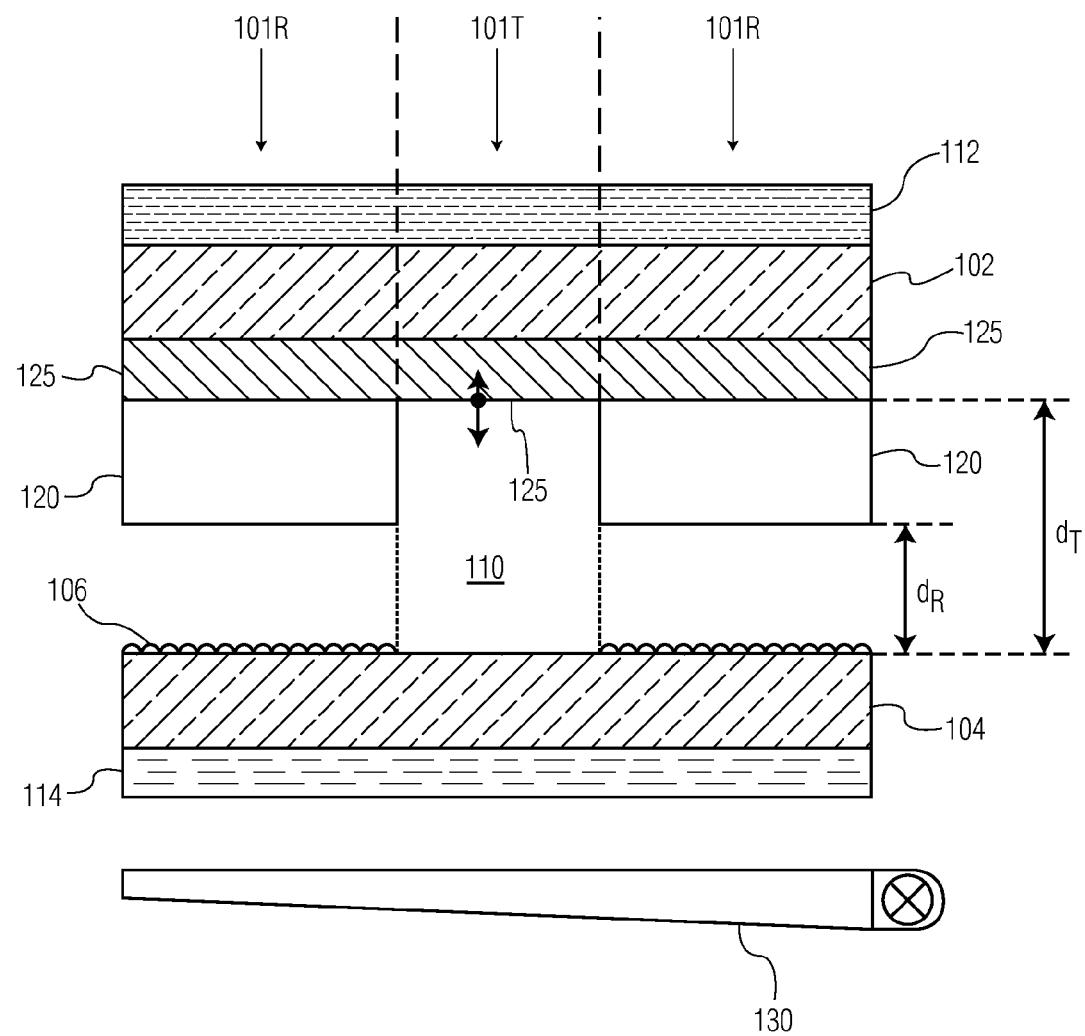

The invention relates to a transflective liquid crystal display device.

Liquid Crystal Displays (LCDs) are increasingly used in handheld devices such as PDAs, mobile phones, etc. For such mobile applications, LCDs have in fact become the standard display device due to low power consumption, reliability and low price.

The operation of LCDs is based on light modulation in a liquid crystalline (LC) cell including an active layer of a liquid crystal material. By applying an electric field, the light modulation by the liquid crystal layer is altered and characteristics of the light passing through the active layer are modified.

A Liquid Crystal Display generally comprises a plurality of picture elements (pixels) arranged in rows and columns. Each pixel of the display is addressable individually, for this purpose the driving means for driving the LC cell usually comprise a separate pixel driver for each picture element of the display.

A Liquid Crystal Display of the transflective type is a display which works in both a transmissive mode, modifying light from a backlight, arranged behind the display, and in a reflective mode, modifying ambient light incident on the display. Such a transflective LCD has excellent readability, both under bright and dark conditions and is therefore particularly suitable for handheld devices.

The liquid crystalline cell of such an LCD comprises transmissive portions and reflective portions. In general, these portions are arranged such that picture elements of the cell comprise both a reflective sub-pixel operating in the reflective mode, and a transmissive sub-pixel operating in the transmissive mode.

In an LCD it is desirable to optimise optical characteristics like brightness, contrast ratio, viewing angle dependency and grey scale inversion. Moreover, these optical parameters should match as well as possible for the transmissive and reflective portions of the cell, in order to ensure uniformity of the displayed image under all light conditions.

For this purpose, the applicant's international patent application WO 03/019276 proposes a transflective LCD with a so-called dual cell gap design, whereby the cell gap, i.e. the thickness of the active liquid crystal layer, for the reflective portions differs from that of the transmissive portions. For optimising the optical parameters in general, the prior art transflective LCD incorporates a patterned retarder layer, having a quarter wave retardation for the reflective portions and zero retardation for the transmissive portions.

However, in the known design it is necessary to incorporate an additional planarization layer to obtain the dual cell gap construction. Such a planarization layer increases device complexity and manufacturing costs.

It is an object of the invention to have a transflective LCD device of the type as set out in the above, which is easier to manufacture and relatively inexpensive.

Thus, the LCD device according to the invention incorporates a retarder on the viewer side, the thickness of the retarder being chosen such as to compensate a difference between the first cell gap and the second cell gap. The transflective LCD employs a dual-cell gap design, whereby the different cell gaps between the reflective and transmissive portions are structurally effected by means of the patterned retarder. Thus, the difference in cell gap between the reflective and transmissive portions is essentially compensated for by the retarder, and further planarization layers are no longer required according to the invention. A transflective LCD according to the invention may be manufactured relatively inexpensively and has a less complex construction.

The invention generally involves the use of a relatively thick in-cell retarder as the difference in cell gap amounts to several micrometers, for example 3 μm.

The retardation R is defined as the product of the optical birefringence Δn and the thickness d of the retarder. The retardation value should approximately be kept the same as in conventional designs.

Consequently, since the in-cell retarder has a relatively large thickness to compensate for the cell gap difference, a material with relatively low optical birefringence should generally be used. The optical birefringence of the retarder material is adapted to the thickness of the retarder in order to obtain a predetermined retardation value. For example, if the retardation value is 150 nm, the optical birefringence of the retarder material should be about 0.05 if the desired retarder thickness is 3 μm.

In a preferred embodiment, the optical retarder is a patterned retarder extending substantially only over the reflective portions of the liquid crystalline cell.

In this case, there is no retarder over the transmissive portions (thus the thickness and the retardation are zero for the transmissive portions).

In another preferred embodiment, the optical retarder is essentially a quarter-wave (λ/4) retarder for the reflective portions. Such a retarder allows relatively high brightness and contrast for the reflective portions of the liquid crystalline cell.

Advantageously, a combination of the preferred embodiments in the above is used, that is, the optical retarder is a patterned retarder extending substantially only over the reflective portions of the LC cell and acting as a quarter-wave (λ/4) retarder for said reflective portions. The brightness and contrast is then comparatively high for the entire LC cell, and the displayed image is homogeneous between the reflective and transmissive portions of the cell.

In a color LCD, in order to obtain particularly homogeneous brightness between the transmissive and reflective portions of the LC cell, the color filter thickness may be different for the transmissive and reflective portions. In that case, preferably, the thickness of the optical retarder is such as to compensate both a difference between the first cell gap and the second cell gap, and said different thickness of said color filter.

The color filter is, in one preferred embodiment, arranged between the optical retarder and the front substrate. In another preferred embodiment, the optical retarder is embedded in the color filter, that is the retarder is arranged between the color filter and the front substrate.

Preferably, the first cell gap for the transmissive portion of the LC cell is between 1.5 and 2.5 times the second cell gap for the reflective portion. More preferably, the first cell gap is about 2 times the second cell gap.

These and other aspects of the invention will now be elucidated with respect to the accompanying drawings. Herein:

FIG. 1 shows an embodiment of a transflective LCD device according to the present invention.

An exemplary embodiment of the present invention is a Liquid Crystal Display device with a transflective LC cell of the 90TN90 type. A single picture element (pixel) 101 of the transflective cell is shown in FIG. 1.

In a 90TN90 LC cell, the liquid crystalline material is of the twisted nematic type, and has a 90 degree twist angle when no voltage is applied to the pixel 101. The cell is placed between crossed polarizers 112, 114. A front polarizer 112 is applied to the front substrate 102, and a rear polarizer 114 is applied to the rear substrate 104. The polarization axes of the front polarizer 112 and the rear polarizer 114 are at a 90 degree angle with respect to each other. The space 110 between the substrates 102, 104 is filled with an optically active liquid crystalline (LC) material.

The substrates 102, 104 are glass substrate and comprise driving means for addressing the pixel 101 of the LCD device. Said driving means generally comprise a matrix structure of row electrodes and column electrodes (not shown). A pixel 101 corresponds to an intersection of a row electrode and a column electrode. By applying a voltage difference over the pixel 101, the light modulation by the active LC material in the pixel 101 changes. In a Twisted Nematic LC cell, the voltage difference generally causes an electric field over the pixel, directed perpendicular to the substrates. The LC material aligns with the electric field. As a result, a viewer will perceive a different pixel color. In an LCD device of the active matrix type, the driving means further comprise a thin film transistor (TFT) for each pixel 101.

The alignment direction of the LC material adjacent the front substrate 102 is substantially in parallel with the polarization axis of the front polarizer 112, and the alignment direction of the LC material adjacent the rear substrate 104 is substantially in parallel with the polarization axis of the rear polarizer 114. Hence, the twist angle of the LC material is about 90 degrees.

The transflective pixel 101 comprises a reflective portion (sub-pixel) 101R and a transmissive portion (sub-pixel) 101T. The transmissive portion has a first cell gap dT, and the reflective portion has a second cell gap dR. That is, in the transmissive portion the layer of LC material has a thickness dT and in the reflective portion the layer of LC material has a thickness dR. For the reflective portion, an internal diffusive reflector 106 is provided for reflecting ambient light back towards a viewer.

A backlight 130 is arranged behind the rear polarizer 114. The backlight provides the light that is modulated by the LC material in the transmissive sub-pixel 101T. The reflector 106 prevents light generated by the backlight 130 from entering the reflective portions 101R of the LC cell. As a result, the LC material in the transmissive sub-pixel 101T essentially only modulates light from the backlight 130, and the LC material in the reflective sub-pixel 101R essentially only modulates ambient light incident onto the LCD device.

In more detail, the 90TN90 LC cell operates in the following way:

The pixel 101 is normally white, i.e. when no voltage difference is applied between the row and column electrode, a viewer perceives a white pixel color.

For the reflective portion 110R of the pixel 101, unpolarized ambient light passes through the front linear polarizer 112 and λ/4 retarder 120 before entering the LC layer 110. The incident ambient light is circularly polarized before entering the LC layer 110.

An initial twist angle of the liquid crystal molecules is 90 degrees. Without any voltage, a retardation of the LC layer for the reflective portions 101R is such that the circularly polarized light becomes linearly polarized after having passed through the LC layer 110. This linearly polarized light is then reflected back by reflector 106, and has regained its original circular polarization when arriving at the λ/4 retarder 120. As a result, the ambient light is modified such that it is able to pass back through the polarizer 112 and thus pass through the LC cell. At zero voltage or minimum driving voltage, the normally white LC cell is thus in its bright state.

However, when a maximum driving voltage is applied between the electrodes, the liquid crystalline cell is changed to its dark state.

The liquid crystal molecules align with the applied electric field, and the initial twist angle of the molecules disappears. Light passing through the LC layer effectively experiences a low birefringence, and consequently the light is still circularly polarized when it arrives at the reflector 106. Upon reflection, the circular polarization is reversed causing the light to have an opposed circular polarization when arriving at the λ/4 retarder layer 120. In this case, light is absorbed by the polarizer 112 and the viewer perceives a dark pixel.

The transmissive portion 101T of the pixel operates on light emitted from a backlight 130. Light generated by the backlight 130 passes rear polarized 114 on rear substrate 104, thereby becoming linearly polarized. This linearly polarized light enters the active LC layer 110, which has a twist angle of 90 degrees.

In the bright state (zero voltage), a retardation of the LC layer for the transmissive portions 101T is such that the linearly polarized light has a perpendicular polarization direction after having passed through the LC layer 110. That is, the linear polarization direction is rotated through 90 degrees. Because of this, the light is able to pass the front polarizer 112 and travel on towards the viewer, who perceives a white pixel.

In the dark state (maximum driving voltage), the liquid crystal molecules align with the applied electric field, and the initial twist angle of the molecules disappears. Light passing through the LC layer effectively experiences a low birefringence, and consequently the polarization direction of the linearly polarized light is hardly changed. Thus, the linearly polarized light is unable to pass the front polarizer 112 and the viewer observes a black pixel.

In order to obtain the operation of the transflective LCD as set out in the above, the retardation value has to be different for the reflective portions 101R and the transmissive portions 101T. This has been achieved by giving the liquid crystal layer 110 different thicknesses for the reflective and transmissive portions. That is, the cell gap dR for the reflective portion 101R is different from the cell gap dT for the transmissive portion 101T. The transmissive cell gap dT is between 1.5 and 2.5 times the reflective cell gap dR, most preferably about 2 times.

According to the present invention, the different cell gaps have been incorporated by means of patterned λ/4 retarder layer 120. This in-cell retarder essentially only extends over the reflective portions 101R of the LC cell. The thickness of the patterned retarder 120 is such, that the retarder structurally effects the difference in cell gaps between the transmissive and reflective portions. Thus, the transmissive cell gap dT is essentially equal to the reflective cell gap dR plus the thickness of the retarder 120. There is no need for a planarization layer as in the prior art, so that device complexity and manufacturing costs are reduced.

For example, the transmissive cell gap dT is 6 μm. The thickness of the reflector 106 is negligible. The reflective cell gap dR is preferably half the transmissive cell gap dT, thus 3 μm. As a result, the patterned retarder 120 extending over the reflective portions 101R of the LC cell has a thickness of 3 μm.

In a color LCD, color filters 125 are generally required to separate white ambient light, or white light from the backlight 130, into the primary colors associated with the color sub-pixels of the LCD device. In the present embodiment, the color filter 125 is arranged on the front substrate 102, and the patterned retarder 120 is provided on top of the color filter.

The color filter 125 has the same thickness for the reflective portions 101R and the transmissive portions 101T of the LC cell.

Alternatively, the color filter and retarder layer are reversed, i.e. the patterned retarder is directly arranged on the substrate and the color filter is provided over the patterned retarder. The color filter thickness may be the same for the reflective portion 101R and the transmissive portion 101T, or the color filter may be thinner for the reflective portion 101R.

The latter may be advantageous, because in the reflective portions 101R of the LC cell, light passes the color filter twice. If the color filter is thinner for the reflective portion 101R, the difference in absorbance between the reflective and transmissive portions is relatively small.

However, in this case, the different thickness of the color filter should also be compensated by means of the patterned retarder 120, to avoid the use of extra planarization layers. Thus, for example, for the transmissive portions 101T of the LC cell the cell gap dT is 6 µm and the color filter thickness is 2 µm. For the reflective portions 101R, the cell gap dR is 3 µm, the color filter thickness is 1 µm. Then, the patterned retarder has a thickness of 4 µm for the reflective portions. Again, there is no retarder over the transmissive portions 101T of the cell.

In all cases, the birefringence of the material used in the patterned retarder should be adapted to the retarder thickness, in order to obtain a desired retardation value. Preferably, the patterned retarder is a quarter wave ($\lambda/4$) retarder. More preferably, for each sub-pixel the retardation value of the quarter wave retarder is matched with the wavelength of the associated primary color.

For example, green light has a wavelength of about 550 nm. A patterned quarter wave retarder extending over the reflective portions of a green sub-pixel has a retardation of about 135 nm. In case of a retarder thickness of 4 µm, the birefringence of the retarder material is about 0.03.

In summary, a transflective Liquid Crystal Display device has a liquid crystalline (LC) cell with reflective portions and transmissive portions). The LCD device has a dual cell-gap design, the cell gap for the transmissive portions differs from the cell gap for the reflective portions. According to the invention, this cell gap difference is effected by means of an optical retarder inside the LC cell. A thickness of said optical retarder is such as to compensate the difference in cell gaps. Preferably, the optical retarder is a patterned retarder extending essentially only over the reflective portions of the cell, and having quarter wave retardance.

The invention claimed is:

1. A transflective liquid crystal display device, comprising:
   a front substrate on a viewer side, and a rear substrate;
   a liquid crystalline cell sandwiched between the front substrate and the rear substrate, said liquid crystalline cell having transmissive portions for selectively passing light generated by a backlight, and reflective portions for selectively reflecting ambient light said transmissive portions provided with a first cell gap and said reflective portions provided with a second cell gap,
   an optical retarder at the viewer side of said liquid crystalline cell, a thickness of said optical retarder being such as to compensate a difference between the first cell gap and the second cell gap; and
   a color filter having a different thickness for the reflective portions and the transmissive portions of the cell, wherein the thickness of the optical retarder is such as to compensate both a difference between the first cell gap and the second cell gap, and said different thickness of said color filter.

2. A transflective liquid crystal display device as claimed in claim 1, wherein the optical retarder includes a quarter-wave retarder for the reflective portions.

3. A transflective liquid crystal display device as claimed in claim 1, wherein the color filter is arranged between the front substrate and the optical retarder.

4. A transflective liquid crystal display device as claimed in claim 1, wherein the optical retarder is arranged between the front substrate and the color filter.

5. A transflective liquid crystal display device as claimed in claim 1, wherein the first cell gap is between 1.5 and 2.5 times the second cell gap.

6. A transflective liquid crystal display device, comprising:
   a front substrate on a viewer side, and a rear substrate;
   a liquid crystalline cell sandwiched between the front substrate and the rear substrate, said liquid crystalline cell having transmissive portions for selectively passing light generated by a backlight, and reflective portions for selectively reflecting ambient light said transmissive portions provided with a first cell gap and said reflective portions provided with a second cell gap,
   a color filter having a different thickness for the reflective portions and the transmissive portions of the cell, and
   a patterned optical retarder at the viewer side of said liquid crystalline cell and on top of said color filter, wherein the thickness of the optical retarder is such as to compensate both a difference between the first cell gap and the second cell gap, and said different thickness of said color filter.

* * * * *